US012264616B1

(12) United States Patent
Bousquet et al.

(10) Patent No.: US 12,264,616 B1
(45) Date of Patent: Apr. 1, 2025

(54) ROTARY ENGINE AND COOLING SYSTEMS THEREOF

(71) Applicant: PRATT & WHITNEY CANADA CORP., Longueuil (CA)

(72) Inventors: Michel Bousquet, Longueuil (CA); Jeremie Barberger, Montreal (CA); Ninad Joshi, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/464,777

(22) Filed: Sep. 11, 2023

(51) Int. Cl.
*F02B 55/10* (2006.01)
*F02B 53/00* (2006.01)

(52) U.S. Cl.
CPC ........ *F02B 55/10* (2013.01); *F02B 2053/005* (2013.01)

(58) Field of Classification Search
CPC ........................... F02B 55/10; F02B 2053/005
USPC ............... 123/18 A, 18 R, 43 A, 45 A, 45 R, 123/200–249; 418/140, 187, 61.1
See application file for complete search history.

(56) References Cited

U.S. PATENT DOCUMENTS 3,313,276 A * 4/1967 Ito .......................... F02B 55/10 418/83
3,572,984 A * 3/1971 Jones ...................... F02B 55/10 418/83
3,691,999 A * 9/1972 Lechler ................... F02B 55/10 418/83
3,743,452 A * 7/1973 Steinwart ................ F02B 55/08 123/41.1
3,895,889 A * 7/1975 Loyd, Jr. ................. F01C 21/06 418/83
3,964,445 A 6/1976 Ernest
4,035,112 A 7/1977 Hackbarth et al.
4,037,998 A 7/1977 Goloff
4,037,999 A 7/1977 Armin
4,531,900 A * 7/1985 Jones ...................... F01C 21/06 418/83
4,826,410 A * 5/1989 Yamamoto ................ F01P 5/10 418/84

(Continued)

FOREIGN PATENT DOCUMENTS

CA 1044144 12/1978
CN 212518643 2/2021

(Continued)

*Primary Examiner* — J. Todd Newton
(74) *Attorney, Agent, or Firm* — NORTON ROSE FULBRIGHT CANADA LLP

(57) ABSTRACT

A rotary engine, has: housings secured to one another, the housings including a first side housing, a second side housing, and a rotor housing disposed between the first side housing and the second side housing; and a rotor rotationally received within a rotor cavity defined by the first side housing, the second side housing, and the rotor housing; wherein the first side housing, the rotor housing, and the second side housing are cooled in parallel via respective coolant passages including: a first side housing coolant passage extending through the first side housing; a second side housing coolant passage extending through the second side housing; and a rotor housing coolant passage extending through the rotor housing, and wherein the coolant passages are free of inter-passage connection between the housings.

20 Claims, 8 Drawing Sheets

(56) References Cited

U.S. PATENT DOCUMENTS

| | | | | |
|---|---|---|---|---|
| 4,915,603 | A * | 4/1990 | Corbett | F02B 55/10 418/83 |
| 6,047,895 | A * | 4/2000 | Pastleitner | F01P 7/14 236/34.5 |
| 6,866,092 | B1 | 3/2005 | Molivadas | |
| 9,376,957 | B2 | 6/2016 | Hughston | |
| 10,259,291 | B2 | 4/2019 | Aldridge | |
| 10,400,660 | B2 | 9/2019 | Nagai | |
| 10,619,554 | B2 | 4/2020 | Takagi | |
| 2005/0268866 | A1 * | 12/2005 | Finkbeiner | F02B 29/0475 123/41.1 |
| 2014/0352654 | A1 * | 12/2014 | Saba | F01C 19/02 123/200 |

FOREIGN PATENT DOCUMENTS

| | | | |
|---|---|---|---|
| EP | 2724003 | B1 | 7/2015 |
| JP | 62251419 | | 11/1987 |

* cited by examiner

ROTARY ENGINE AND COOLING SYSTEMS THEREOF

TECHNICAL FIELD

The application relates generally to internal combustion engines and, more particularly, to rotary internal combustion engines and to cooling systems of such engines.

BACKGROUND

Combustion chambers of a rotary engine, such as a Wankel engine, are delimited radially by the rotor and rotor housing and axially by a side housing. The side housing faces the combustion chambers and is thus subjected to high pressure and thermal loads. On the other hand, the side housing provides the running surface for the rotor's side seals. During use, the rotor housing becomes hot and requires cooling. Existing cooling systems may require intricate sealing arrangements between adjacent rotor and side housings to prevent leakage. Continuous improvements are sought.

SUMMARY

In one aspect, there is provided a rotary engine, comprising: housings secured to one another, the housings including a first side housing, a second side housing, and a rotor housing disposed between the first side housing and the second side housing; and a rotor rotationally received within a rotor cavity defined by the first side housing, the second side housing, and the rotor housing; wherein the first side housing, the rotor housing, and the second side housing are cooled in parallel via respective coolant passages including: a first side housing coolant passage extending through the first side housing; a second side housing coolant passage extending through the second side housing; and a rotor housing coolant passage extending through the rotor housing, and wherein the coolant passages are free of inter-passage connection between the housings.

The rotary engine described above may include any of the following features, in any combinations.

In some embodiments, flow paths extend through the housings, the flow paths including a first flow path extending within the first side housing coolant passage, a second flow path extending within the second side housing coolant passage, and a third flow path extending within the rotor housing coolant passage, the flow paths free from intersection with one another.

In some embodiments, the flow paths are free from intersection with mounting interfaces between the housings.

In some embodiments, the coolant passages are fluidly connected in parallel to a source of coolant via a valve, having a closed configuration and one or more open configurations each having a respective flow circulating area for varying a flow rate of a coolant through the coolant passages.

In some embodiments, the valve includes a first valve in fluid communication with the first and second side housing coolant passages and a second valve in fluid communication with the rotor housing coolant passage.

In some embodiments, the valve is located downstream of the housings, the valve being a thermostatic valve operable to move from the closed configuration to one of the one or more open configurations when a temperature of the coolant flowing through the housings exceeds a temperature threshold.

In some embodiments, a heat exchanger is fluidly connected to respective outlets of the coolant passages, the heat exchanger providing heat exchange relationship between a coolant and a heat-transfer medium.

In some embodiments, a bypass valve is between the housings and the heat exchanger, the bypass valve operable to selectively fluidly connect the coolant passages to the heat exchanger or to a bypass conduit bypassing the heat exchanger.

In some embodiments, the rotor housing coolant passage includes a first section and a second section spaced apart from the first section, the rotor housing including a coolant port, a coolant inlet, and a coolant outlet, the first section fluidly connecting the coolant inlet to the coolant port, the second section fluidly connecting the coolant outlet to the coolant port.

In some embodiments, the housings further include an intermediate housing disposed between the first side housing and the second side housing and wherein the rotor housing includes a first rotor housing and a second rotor housing, the first rotor housing disposed between the first side housing and the intermediate housing, the second rotor housing disposed between the second side housing and the intermediate housing, the intermediate housing including an intermediate housing coolant passage fluidly separated from the first side housing coolant passage, the second side housing coolant passage, and the rotor housing coolant passage, and wherein the intermediate housing coolant passage, the first side housing coolant passage, the second side housing coolant passage, and the rotor housing coolant passage being fluidly connected in parallel with no coolant flow connection across the housings.

In another aspect, there is provided a rotary engine, comprising: housings secured to one another, the housings including a first side housing, a second side housing, and a rotor housing clamped in sandwich between the first side housing and the second side housing; a rotor rotationally received within a rotor cavity defined by the housings; and a parallel flow coolant circuit operable to individually cool the first side housing, the second side housing, and the rotor housing, the parallel flow coolant circuit having first, second, and third coolant passages extending respectively through the first side housing, the second side housing, and the rotor housing, wherein the first, second, and third coolant passages are fluidly independent from one another.

The rotary engine described above may include any of the following features, in any combinations.

In some embodiments, flow paths extend through the housings, the flow paths including a first flow path extending within the first coolant passage, a second flow path extending within the coolant passage, and a third flow path extending within the third coolant passage, the flow paths free from intersection with one another.

In some embodiments, the flow paths are free from intersection with mounting interfaces between the housings.

In some embodiments, the first, second, and third coolant passages are fluidly connected in parallel to a source of coolant via a valve, having a closed configuration and one or more open configurations each having a respective flow circulating area for varying a flow rate of a coolant through the first, second, and third coolant passages.

In some embodiments, the valve includes a first valve in fluid communication with the first and second coolant passages and a second valve in fluid communication with the third coolant passage.

In some embodiments, the valve is located downstream of the housings, the valve being a thermostatic valve operable to move from the closed configuration to one of the one or more open configurations when a temperature of the coolant flowing through the housings exceeds a temperature threshold.

In some embodiments, a heat exchanger is fluidly connected to respective outlets of the first, second, and third coolant passages, the heat exchanger providing heat exchange relationship between a coolant and a heat-transfer medium.

In some embodiments, a bypass valve is between the housings and the heat exchanger, the bypass valve operable to selectively fluidly connect the first, second, and third coolant passages to the heat exchanger or to a bypass conduit bypassing the heat exchanger.

In some embodiments, the third coolant passage includes a first section and a second section spaced apart from the first section, the rotor housing including a coolant port, a coolant inlet, and a coolant outlet, the first section fluidly connecting the coolant inlet to the coolant port, the second section fluidly connecting the coolant outlet to the coolant port.

In yet another aspect, there is provided a rotary engine, comprising: a stack of housings secured to one another and abutting one another at mounting interfaces, the housings including: a first side housing, a second side housing, an intermediate housing, a first rotor housing disposed between the first side housing and the intermediate housing, and a second rotor housing disposed between the intermediate housing and the second side housing; and rotors rotationally received within rotor cavities defined by the housings, the housings being cooled in parallel via respective coolant passages extending from respective inlets to respective outlets, the respective coolant passages free from intersection with the mounting interfaces, the mounting interfaces being free of a coolant seal.

In still yet another aspect, there is provided a motor assembly, comprising: a plurality of power modules, each power module of the plurality of power modules being operable to generate a force; a fluid supply manifold; a fluid outlet manifold; and a plurality of fluid conduits that fluidly connect the fluid supply manifold to the fluid outlet manifold and that are free from fluid interconnections fluidly between the fluid supply manifold and the fluid outlet manifold; and wherein each fluid conduit of the plurality of fluid conduits is defined in part by a power module of the plurality of power modules.

The motor assembly described above may include any of the following features, in any combinations.

In some embodiments, the plurality of power modules include a power module that is a thermal engine module.

In some embodiments, flow paths extend through the housings, the flow paths including a first flow path extending within the first coolant passage, a second flow path extending within the second coolant passage, and a third flow path extending within the third coolant passage, the flow paths free from intersection with one another.

In some embodiments, the thermal engine module is a rotary engine module.

In some embodiments, the plurality of power modules includes a power module that is an electric power module.

In some embodiments, the first, second, and third coolant passages are fluidly connected in parallel to a source of coolant via a valve, having a closed configuration and one or more open configurations each having a respective flow circulating area for varying a flow rate of a coolant through the first, second, and third coolant passages.

BRIEF DESCRIPTION OF THE DRAWINGS

Reference is now made to the accompanying figures in which.

DETAILED DESCRIPTION

Figure 1A:
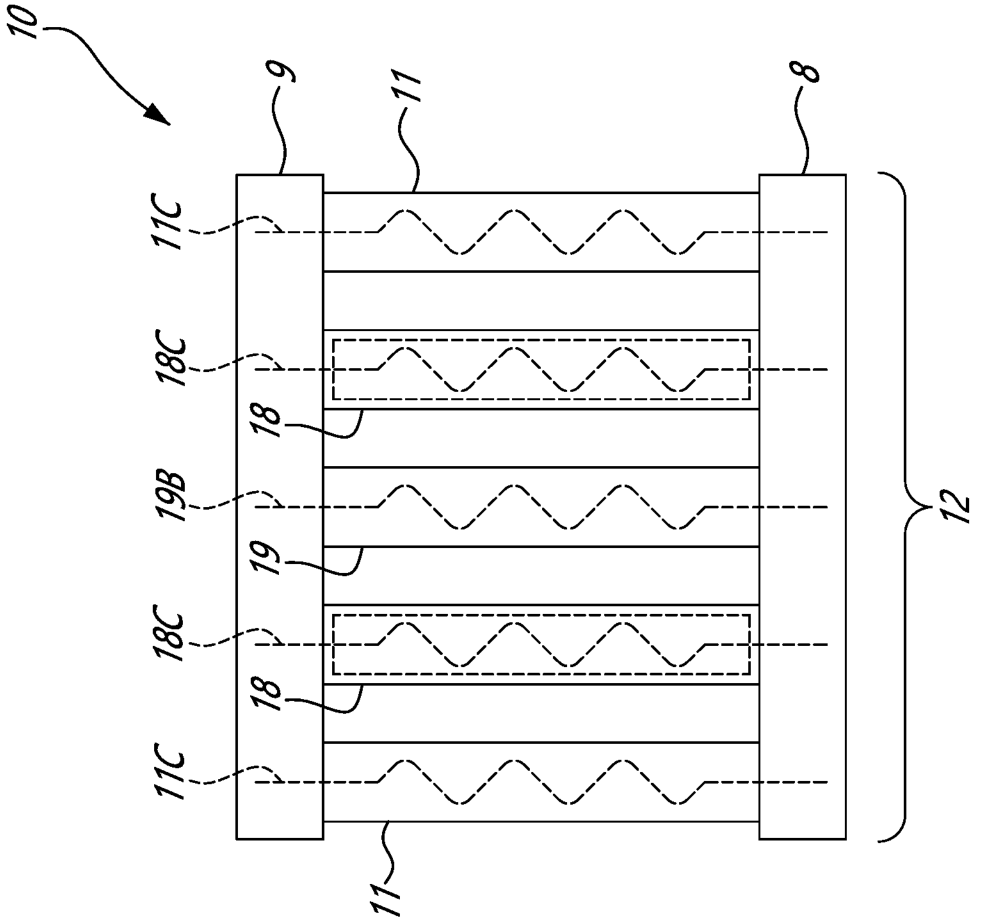
FIG. 1A is a schematic side assembly view of a rotary internal combustion engine in accordance with one embodiment.

Referring now to FIG. 1A, motor assembly including a plurality of power modules each being operable to generate a force (e.g., torque) is shown. The power modules may be thermal engine modules, electric power modules, and any combinations of the above. In the depicted embodiment, the motor assembly includes a plurality of thermal engine modules that are each rotary engines. Hence, the motor assembly of the present disclosure corresponds to a multi-rotor internal combustion engine, referred to below simply as a rotary engine 10. The thermal engine modules may be, alternatively, piston engine or any kind of reciprocating internal combustion engine having at least one combustion chamber of varying volume. The rotary engine 10 is depicted in FIG. 1A as including two rotors, but may include more than two rotors or only one rotor in alternate embodiments. Each of the rotor and respective housings enclosing the rotor may be considered a power module. Hence, in FIG. 1A, the rotary engine 10 includes two power modules, but more or less may be used. The rotary engine 10 may be a Wankel engine. The rotary engine 10 comprises an outer body also referred to as a housing assembly 12 including a stack of housings. The stack of housings includes axially-spaced side housings 11, which each may include a side wall 11A (FIG. 1C) and a side plate 11B (FIG. 1B) mounted to the side wall 11A, with a rotor housing 18 extending from one of the side housings 11 to the other (for a single rotor engine), to form a rotor cavity 20. The side plate 11B may define the face against which the rotor rides during use whereas the side wall 11A may be used to hold the side plate 11B and is mounted to the rotor housing 18. More detail about this configuration may be found in U.S. patent application Ser. No. 18/054,701, the entire contends of which are incorporated by reference herein. In some alternate embodiments, the side housings 11 include solely the side wall, that is, the side wall and the side plate may be combined into a single element.

In the depicted embodiment, the outer body 12 further includes an intermediate housing 19 and the rotor housing 18 includes two rotor housings. Each of the rotor housings 18 is disposed between a respective one of the side housings 11 and the intermediate housing 19. Put differently, the rotor housing 18 includes a first rotor housing and a second rotor housing. The first rotor housing is disposed between a first one of the side housings 11 and the intermediate housing 19. The second rotor housing disposed between a second one of the side housings 11 and the intermediate housing 19. Regardless of a number of rotors, the rotary engine includes only two side housings disposed at opposite ends of the engine. A number of the intermediate housing 19 equals a number of the rotor minus 1 (e.g., one intermediate housing for a two-rotor engine, two intermediate housings for a three-rotor engine, and so on). The different housings are clamped in sandwich.

The side housings 11, the intermediate housing 19, and the rotor housings 18 conjointly define rotor cavities 20 (FIG. 2) each receiving a respective rotor 22. The intermediate housing 19 therefore defines opposite axial end faces that are each engaged by a respective one of the rotors 22. The intermediate housing 19 may include an intermediate wall 19A (FIG. 1C) and two intermediate plates secured on opposite sides of the intermediate wall. The intermediate plates may define the faces against which the rotors ride during use. The intermediate wall 19A is secured to the rotor housings disposed on opposite sides thereof.

Still referring to FIG. 1A, the rotor housings 18 have each a first side and a second side opposite to the first side. The side housings 11 include a first side housing secured to the first side of a first one of the rotor housings 18 and a second side housing secured to the second side of a second one of the rotor housings 18. The rotor cavities 20 are defined axially between the side housings 11 and the intermediate housing 19 and circumscribed by the rotor housings 18.

Figure 1B:
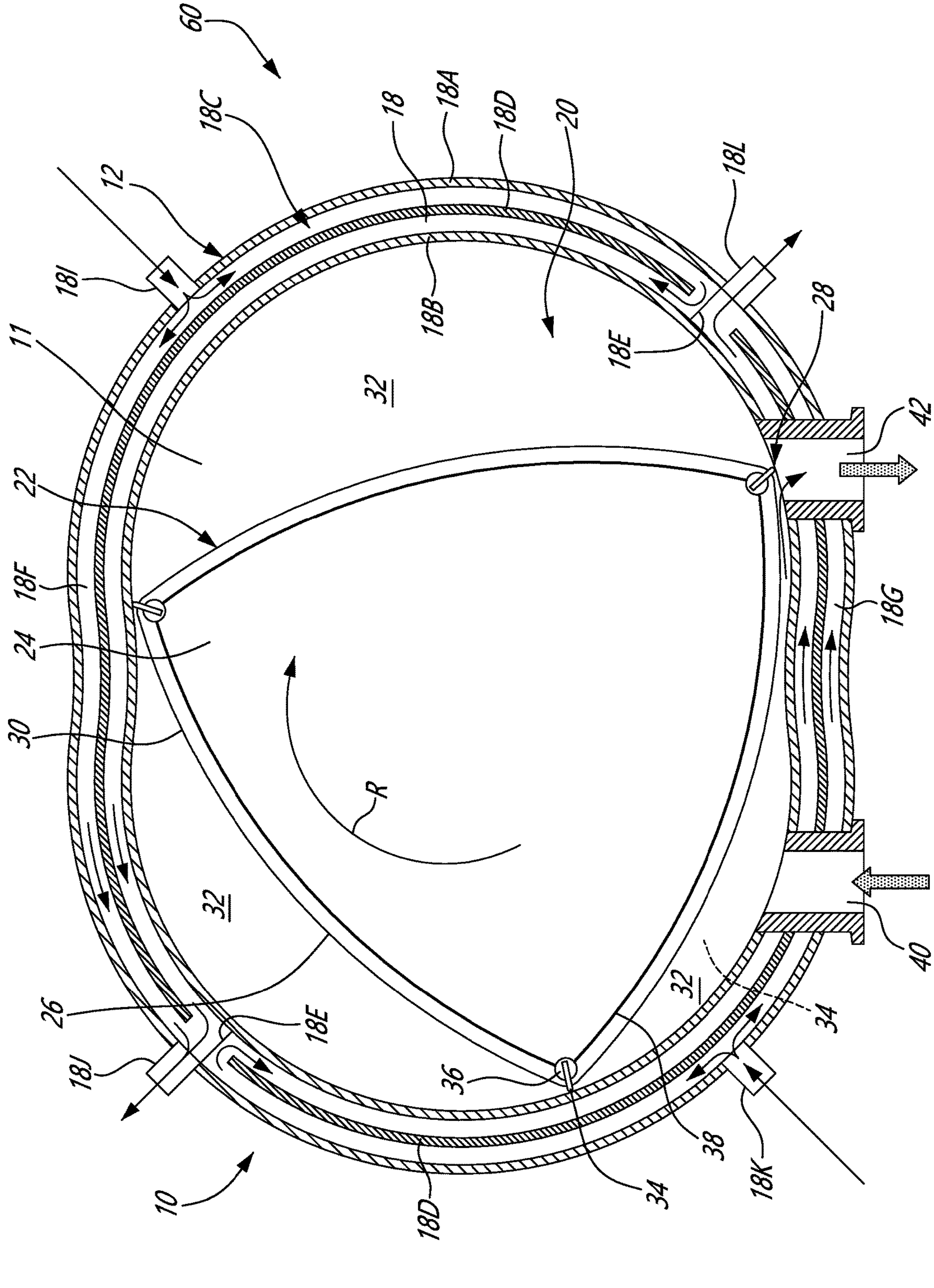
FIG. 1B is a schematic cross-sectional view of a rotor housing in accordance with one embodiment to be used with the rotary internal combustion engine of FIG. 1A.

Referring now to FIG. 1B, the rotor housing 18 and rotor 22 are described in greater detail. The rotor housing 18 has an inner surface having a profile defining two lobes, which may be an epitrochoid. An inner body or rotor 22 is received within one of the rotor cavities 20. The rotor 22 has axially spaced end faces 24 adjacent to the side walls 14, and a peripheral face 26 extending there between. The peripheral face 26 defines three circumferentially-spaced apex portions 28, and a generally triangular profile with outwardly arched sides 30. The apex portions 28 are in sealing engagement with the inner surface of rotor housing 18 to form three rotating combustion chambers 32 between the rotor 22 and housing assembly 12. The combustion chambers 32 vary in volume with rotation of the rotor 22 within the housing assembly 12. The geometrical axis of the rotor 22 is offset from and parallel to the axis of the housing assembly 12. In some embodiments, more or less than three rotating combustion chambers may be provided with other shapes of the rotor.

The combustion chambers 32 are sealed. In the embodiment shown, each rotor apex portion 28 has an apex seal 34 extending from one end face 24 to the other and biased radially outwardly against the rotor housing 18. An end seal 36 engages each end of each apex seal 34 and is biased against the respective side housing 11. Each end face 24 of the rotor 22 has at least one arc-shaped face seal 38 running from each apex portion 28 to each adjacent apex portion 28, adjacent to but inwardly of the rotor periphery throughout its length, in sealing engagement with the end seal 36 adjacent each end thereof and biased into sealing engagement with the adjacent side housings 11. Alternate sealing arrangements are also possible.

Although not shown in the Figures, the rotor 22 is journaled on an eccentric portion of a shaft such that the shaft rotates the rotor 22 to perform orbital revolutions within the rotor cavity 20. The shaft may rotate three times for each complete rotation of the rotor 22 as it moves around the rotor cavity 20. Oil seals are provided around the eccentric to impede leakage flow of lubricating oil radially outwardly thereof between the respective rotor end face 24 and side housings 11. During each rotation of the rotor 22, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 42 In the embodiment shown, the ports 40, 42 are defined in the rotor housing 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary unit 10 operates under the principle of the Miller or Atkinson cycle, with its compression ratio lower than its expansion ratio, through appropriate relative location of the primary inlet port 40 and exhaust port 42.

Figure 2:
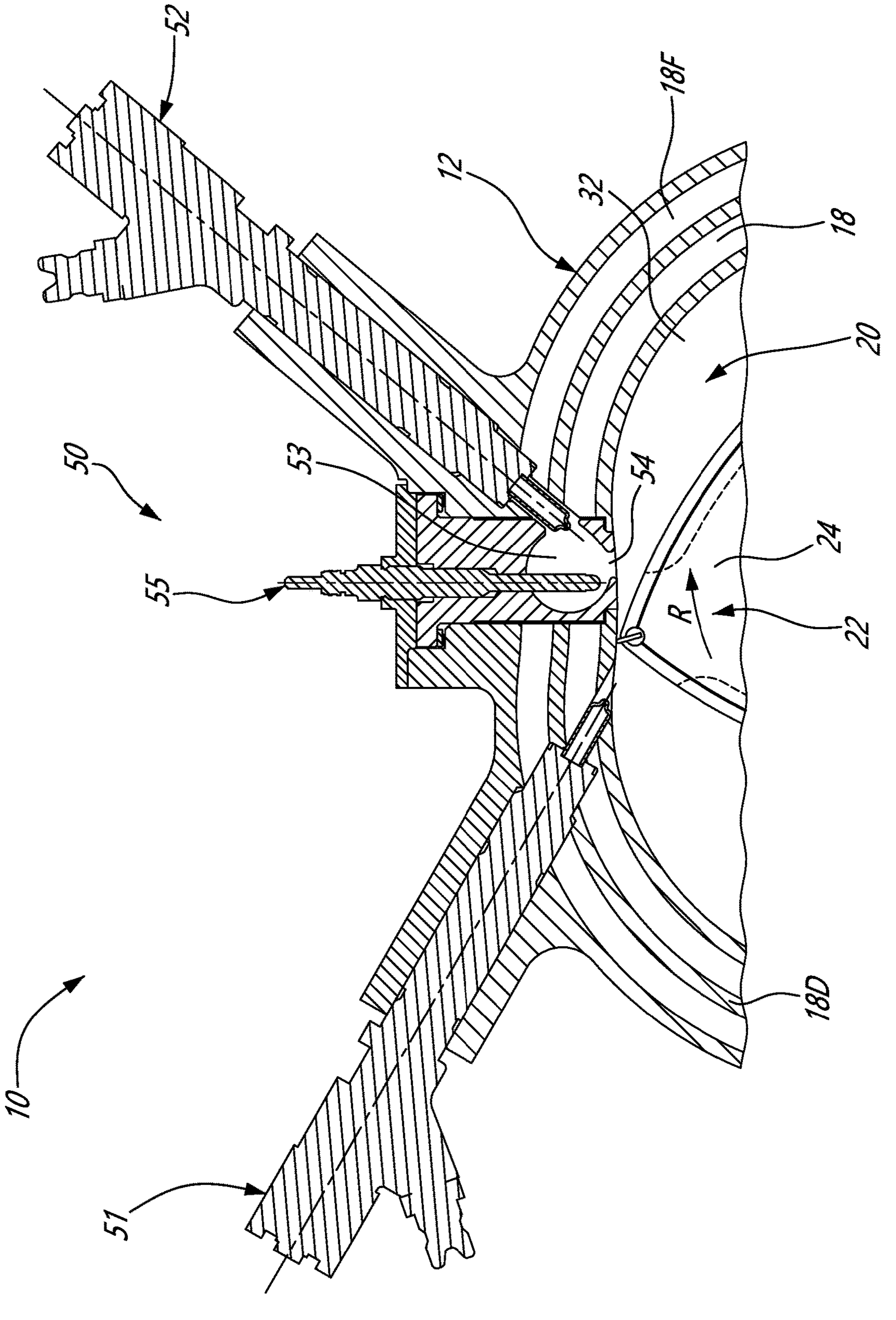
FIG. 2 is a cross-sectional view of a portion of the rotor housing of FIG. 1B for the rotary internal combustion engine of FIG. 1A illustrating a pilot subchamber and an injection system thereof.

Referring to FIG. 2, the rotary unit 10 includes a fuel injection system 50 having a main injector 51 and a pilot injector 52. The rotor housing 18 defines a pilot subchamber 53, which may be provided in an insert or defined directly by the rotor housing 18. The pilot subchamber 53 is located radially outwardly of an inner face of the rotor housing 118 against which the rotor 22 rides during use. The pilot subchamber 53 is in communication with the rotor cavity 20. In the embodiment shown, the pilot subchamber 53 has a circular cross-section; alternate shapes are also possible. The pilot subchamber 53 communicates with the rotor cavity 20 through at least one opening or outlet 54, and has a shape forming a reduced cross-section adjacent the opening outlet 54, such that the outlet 54 defines a restriction to the flow between the pilot subchamber 53 and the rotor cavity 20. The outlet 54 may have various shapes and/or be defined by multiple holes. An igniter 55 may have its tip located within the pilot subchamber 53 to ignite a mixture of fuel and air received therein. Understandably, this section of the rotor housing 18 may be come hotter than a remainder of the rotor housing since the combustion of the fuel received into the pilot subchamber 53 via the pilot injector 52 will generate heat. Moreover, the combustion of the fuel received into the main chamber 32 independently of the pilot subchamber 53 via the main injector 51 will also generate heat. This may, in turn, cause a non-uniformity of the heat distribution in the rotor housing 18. In some alternate embodiments, the pilot subchamber 53 may be omitted.

Typically, rotary engines are cooled by coolant passages that extend from one housing to the next in an axial direction relative to an axis of rotation of a shaft driven by the rotors. This may require complex sealing arrangements between the different housings (e.g., side housings 11, rotor housings 18, intermediate housings 19). Moreover, the side housing 11 located at the end of the loop is less cooled since the coolant has already picked up heat from the upstream housings. Moreover, in some configurations, it may be desired to vary the quantity of coolant flown in the coolant passage to increase or decrease the cooling of the housing(s). The cooling systems disclosed below may at least partially alleviate these drawbacks.

Referring back to FIG. 1B, the rotor housing 18 has an outer wall 18A and an inner wall 18B spaced apart from the outer wall 18A to define a rotor housing coolant passage 18C therebetween. The rotor housing coolant passage 18C extends through the rotor housing 18. The rotor housing coolant passage 18C extends at least partially around the rotor 22 and around the rotor cavity 20 and may extend fully around the rotor 22 and rotor cavity 20. Both of the outer wall 18A and the inner wall 18B extend around the rotor cavity 20 and extend axially from one of the side housing to the other. The inner wall 18B defines an inner face against which the rotor rides during use. The rotor housing 18 may include peripheral inner walls 18D and radial inner walls 18E to divide the rotor housing coolant passage 18C in two or more sections. In the embodiment shown, the rotor housing coolant passage 18C includes a first section 18F and a second section 18G spaced apart from the first section 18F. The two sections may be circumferentially and/or radially offset from one another. The rotor housing coolant passage 18C includes a peripheral coolant inlet 181 and a peripheral coolant outlet 18J. It may include a secondary peripheral coolant inlet 18K and a secondary peripheral coolant outlet 18L when the rotor housing coolant passage 18C has two sections as disclosed herein. It will be appreciated that the rotor housing 18 may define a coolant port, a coolant inlet, and a coolant outlet; the coolant port being either an inlet or an outlet. In such an embodiment, the first section fluidly connects the coolant inlet to the coolant port and the second section fluidly connects the coolant outlet to the coolant port. Hence, only one coolant inlet and two coolant outlets, or only one coolant outlet and two coolant inlets may be provided. Any suitable configurations and any number of coolant sections are contemplated.

Figure 1C:
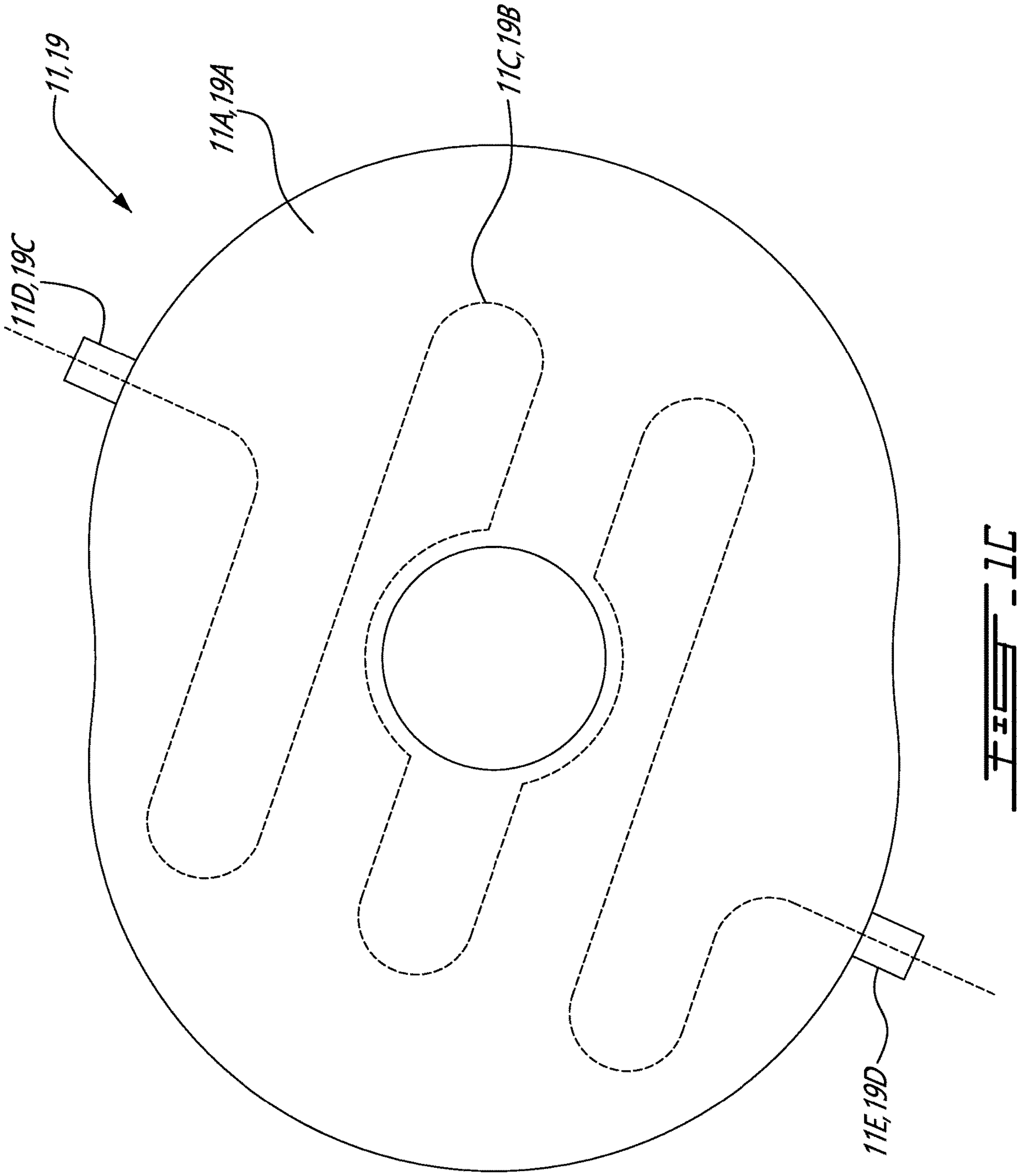
FIG. 1C is a schematic cross-sectional view of a side housing or of an intermediate housing in accordance with one embodiment to be used with the rotary internal combustion engine of FIG. 1A.

Referring now to FIG. 1C, the side housing 11, and more particularly the side wall 11A is shown. The side wall 11A is located at an end of the rotary engine 10 and is secured to the rotor housing 18. In the depicted embodiment, the side wall 11A defines a side housing coolant passage 11C extending from a side housing coolant passage inlet 11D to a side housing coolant passage outlet 11E. The side housing coolant passage 11C may extend around a plurality of internal walls such as to have a tortuous shape to maximize heat transfer from the side wall 11A to the coolant. The side housing 11 and intermediate housing 19 define a central hole for receiving a shaft of the rotary engine 10.

Still referring to FIG. 1C, a similar configuration is provided for the intermediate housing 19 in which the intermediate wall 19A has an intermediate housing coolant passage 19B extending from an intermediate housing coolant passage inlet 19C to an intermediate housing coolant passage outlet 19D. A similar tortuous shape may be provided to maximize heat transfer to the coolant.

Referring back to FIG. 1A, in the embodiment shown, the side housing coolant passages 11C, the intermediate housing coolant passage 19B, and the rotor housing coolant passages 18C are fluidly separated from one another and are free of a seal between the intermediate housing 19 and the rotor housings 18 and between the rotor housings 18 and the side housings 11. In the presented embodiment, a parallel flow coolant circuit is defined by the outer body 12 and is operable to individually cool the different housings (e.g., side housings 11, rotor housings 18, intermediate housing 19). The expression "parallel" in the context of the present disclosure implies that each of the housings is simultaneously cooled via a dedicated flow of coolant. This dedicated flow of coolant, once it enters one of the housings, is not shared with the other housings. This is contrary to a configuration in "series" where the same flow of coolant cools each of the housings, one after the other. A configuration in series may case the coolant to pick up less and less heat as it flows through the different housings since its temperature increases as it flows through the different housings. More specifically, each of the side housing coolant passages 11C, the intermediate housing coolant passage 19B, and the rotor housing coolant passages 18C are fluidly independent and separated from one another as these coolant passages extend within the intermediate housing 19, the rotor housings 18, and the side housings 11. Thus, the coolant passages are free of inter-passage connection between the housings. Inter-passage connection corresponds to fluid connection from one of the housing to the other either via external conduits or via ports defined by the housings at the mounting interfaces. Hence, coolant that enters one of the side housings 11, the rotor housing 18, and the intermediate housing 19 exits the same one of the side housings 11, the rotor housing 18, and the intermediate housing 19. As discussed above, each of the side housings 11, the rotor housing 18, and the intermediate housing 19 has a respective dedicated inlet and a respective dedicated outlet. Thus, the coolant flows in parallel within each of the side housings 11, the rotor housing 18, and the intermediate housing 19 along respective flow paths from a respective inlet to a respective outlet without intersection between these flow paths. Therefore, a first coolant flow path extends solely within the first side housing, a second coolant flow path extends solely within the second side housing, and the rotor housing coolant flow path extends solely within the rotor housing. When an intermediate housing is used, an intermediate flow path extends solely within the intermediate housing. The coolant passages are therefore free from intersection with the mounting interfaces defined between the different housings. Put differently, there is no coolant flow connection across the housings.

It will be appreciated that, in some embodiments, the rotary engine 10 may not require three-piece housings. Hence, the rotary engine 10 includes at least one flow path per housing; the flow paths of different housing are free from interconnection from one another. In other words, the flow path(s) of each housing are fluidly independent from one another.

Consequently, there may be no sharing of coolant between the different housings. Each of the housings have dedicated inlets and outlets and the coolant passages of these housings are free of intersection with mounting interfaces defined between these housings. These mounting interfaces correspond to mating faces of the different housings. In other words, the side housing coolant passage 11C extends along a flow path that is free from intersection with an interface between the side housing 11 and the rotor housing 18. The rotor housing coolant passage 18C extends along a flow path that is free from intersection with an interface between the rotor housing 18 and the side housing 11 and free from intersection with an interface between the rotor housing 18 and the intermediate housing 19. The intermediate housing coolant passage 19B extends along a flow path that is free from intersection with interfaces between the intermediate housing 19 and both of the rotor housings 18 located on opposite sides thereof. The interfaces between the housings are free of coolant seal. A coolant seal is a seal (e.g., elastomeric member) used for preventing coolant leakage. A lubricant seal or a combustion gas seal may be disposed at interfaces between the housings to prevent leakage of lubricant or combustion gases, but there may be no seal used for preventing leakage of coolant at the interfaces between the housings. The configuration of the distinct fluidly independent coolant passages may render obsolete the use of coolant seal between the housings.

Still referring to FIG. 1A, the rotary engine 10 may include a fluid supply manifold 8 and a fluid outlet manifold 9. The fluid supply manifold 8 is used to receive a coolant from a source of coolant and to distributed this coolant between the different coolant passages 11C, 19B, 18C of the housings 11, 18, 19 of the rotary engine 10. The fluid outlet manifold 9 is used to receive the coolant from the different coolant passages and to flow the coolant back towards the source of coolant. As shown in FIG. 1A, a plurality of fluid conduits fluidly connect the fluid supply manifold 8 to the fluid outlet manifold 9. The plurality of fluid conduits are fluidly connect the fluid supply manifold 8 to the fluid outlet manifold 9 and are free from fluid interconnections fluidly between the fluid supply manifold 8 and the fluid outlet manifold 9. Each fluid conduit of the plurality of fluid conduits is defined in part by a power module of the plurality of power modules. These fluid conduits include the coolant passages 11C, 19B, 18C. The fluid conduits are free from fluid interconnections fluidly between the fluid supply manifold and the fluid outlet manifold. In the context of the present disclosure, a fluid conduit that connects a first component to a second component implies any combination of elements that convey a fluid from the first component to the second component, and is suitable for its stated purpose. For example, a fluid conduit connecting the first component to the second component may include any one or a combination of any one or more of: a filter, a pump, a valve, a pipe, a hose, a bore through a part of an engine block, etc. In the case of an electric power module, a coolant passage may extend within a housing of an electric motor.

Figure 3:
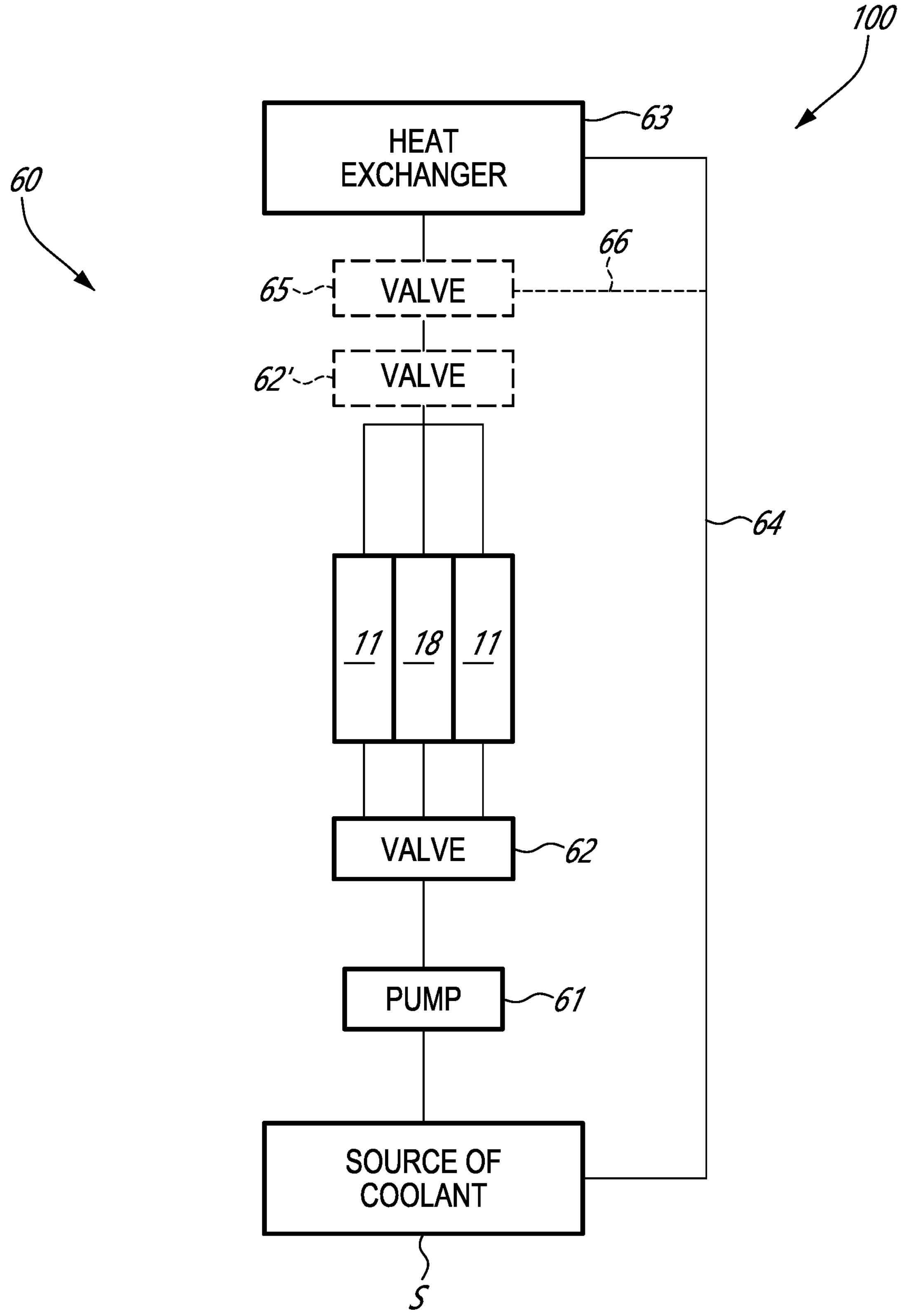
FIG. 3 is a schematic view of a rotary engine and cooling system thereof in accordance with one embodiment.

Referring now to FIG. 3, a rotary engine, which is a single rotor engine, is shown at 100 and includes a coolant system shown at 60. The rotary engine 100 therefore has a rotor housing 18 disposed between two side housings 11. A rotor is located within a cavity defined between the two side housings 11 and surrounded by the rotor housing 18. The coolant system 60 is used for flowing a coolant into the rotor housing coolant passage 18C (FIG. 1B) and into the side housing coolant passages 11C (FIG. 1C) for cooling the rotary unit 10 during use. More specifically, in operation, combustion of the fuel generates heat that is transmitted to the side housings 11 and to the rotor housing 18. This heat is at least partially dissipated by a coolant flowing within the rotor housing coolant passage 18C and the side housing coolant passages 11C, which are independent from one another as described above.

As illustrated in FIG. 3, the rotary engine 100 includes a pump 61 for driving a flow of the coolant from the source of coolant S towards the coolant passages 11C, 18C of the different housings 11, 18. The pump 61 may be powered via a dedicated motor (e.g., an electric motor or the like). Alternatively, the pump 61 may be drivingly engaged by the rotary engine 100, either directly or through a gearbox or other suitable form of transmission. The coolant may be a water-based coolant or any other suitable coolant.

A valve 62 may fluidly connect the source of coolant S to the coolant passages such that the coolant flows to the rotary engine 100 through the valve 62. The valve 62 has a closed configuration in which the valve 62 blocks fluid communication between the source of coolant S and the coolant passages, and one or more open configurations in which the valve 62 fluidly connects the source of coolant S to the coolant passages. The valve 62 thus has a plurality of positions each defining a respective flow circulating area to adjust a mass flow rate of the coolant that reaches the coolant passages. In some embodiments, the valve 62 may be omitted and the pump 61 may be used to adjust the mass flow rate of the coolant. The pump 61 may be driven at a plurality of speeds each associated with a respective coolant mass flow rate.

In the embodiment illustrated, the coolant is a dedicated coolant, such as water or any other suitable fluid (e.g., ethylene-glycol). That is the coolant is different than a lubricant used for lubricating the rotary engine 100. Put differently, a lubrication system and a coolant system of the rotary engine 100 are fluidly separated from one another. There may be no mixture between the coolant system and the lubrication system. They each flow via dedicated fluidly separated passages. The coolant is therefore a fluid different than a lubricant used for lubricating parts of the rotary engine 100. In some embodiments, the lubricating fluid and the cooling fluid may be the same fluid (e.g., oil), but each flows within its own dedicated and separated circuits.

The valve 62 flows the coolant to the different coolant passages. The coolant picks up heat from the housings 11, 18 and the heated coolant flows out of the housings 11, 18 to reach a heat exchanger 63 to be cooled. The heat exchanger 63 may be an air-cooled cooler (or any other suitable cooler) and has at least one first conduit in fluid flow communication with the different coolant passages of the housings 11, 18 and at least one second conduit in fluid communication with a source of a heat-transfer medium (e.g., air). The at least one first conduit is in heat exchange relationship with the at least one second conduit to transfer heat from the coolant to the heat-transfer medium via their respective passages in the heat exchanger 63. The heat-transfer medium may be, for instance, air of an environment outside an aircraft or another vehicle equipped with the rotary engine 100. The heat-transfer medium may be, alternatively, fuel flowing from a fuel tank to the rotary engine 100 since the fuel may be colder than the coolant. The heat exchanger 63 has an inlet receiving the coolant from the housings 11, 18 and an outlet fluidly connected to the source of coolant S via a return conduit 64. Although not illustrated, a coolant manifold may be used to divide an incoming flow of coolant from the pump 61 to divide the coolant between the different rotary units and another coolant manifold may be used to combine flows of coolant exiting the housings 11, 18 to converge them towards a single inlet of the heat exchanger 63.

The rotary engine 100 may include a bypass valve 65, which may be omitted in some embodiments, operable to selectively fluidly connect the housings 11, 18 to the heat exchanger 63 or to fluidly connect the housings 11, 18 to the source of coolant S independently of the heat exchanger 63. Put differently, the bypass valve 65 has a first configuration in which the housings 11, 18 are fluidly connected to the source of coolant S through the heat exchanger 63 and a second configuration in which the housings 11, 18 are fluidly connected to the source of coolant S via a bypass conduit 66 while bypassing the heat exchanger 63. The bypass conduit 66 extends from the bypass valve 65 to the return conduit 64 downstream of the outlet of the heat exchanger 63 such that a flow path through the bypass conduit 66 bypasses the heat exchanger 63. Therefore, in the second configuration of the bypass valve 65, the coolant flows directly out of the housings 11, 18 into the source of coolant S via the bypass conduit 66 and does not flow through the heat exchanger 63.

The valve 62 in this configuration is located upstream of the housings 11, 18 relative to a flow of coolant and may be controlled by a controller causing its closing or opening. Alternatively, the valve 62 may be located downstream of the housings 11, 18 and may be a thermostatic valve including a wax motor. This alternate position of the valve 62 is shown at 62' in FIG. 3. The valve 62 may be operable to move towards one of the plurality of its open positions as a function of an outlet temperature of the coolant. More specifically, wax of the wax motor of the thermostatic valve may expand as a function of temperature of the coolant exiting the housings 11, 18. Thus, the higher is the temperature of the coolant, the more open and the greater may be the flow circulating area of the valve 62 to increase a flow of coolant through the housings 11, 18 to increase cooling so that more heat is extracted from the housings 11, 18. Also, as the coolant decreases in temperature, the valve 62 may close by contraction of the wax of the wax motor to reduce the flow circulating area. Passive control of the coolant flow through the housings 11, 18 may thus be achieved with the thermostatic valve, which may open when the temperature of the coolant exceeds a temperature threshold.

Contrary to previous cooling systems, the coolant is not shared between the different housings. As aforementioned, each of the housings may be cooled via a dedicated flow of coolant that flows through only one of the housings at a time. This may allow the removal of any seal at interfaces between the different housings, such as between the rotor housing 18 and the side housings 11.

Figure 4:
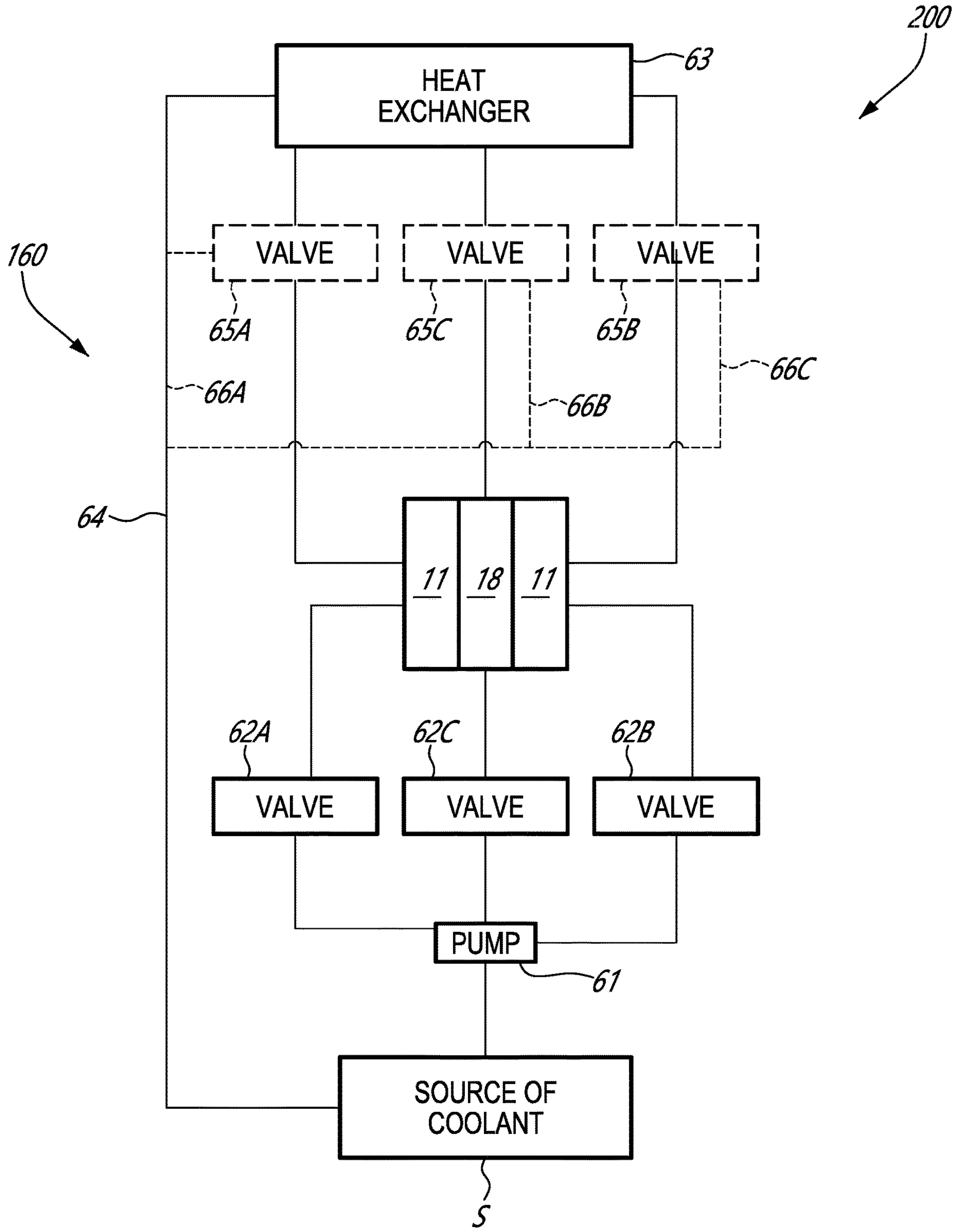
FIG. 4 is a schematic view of a rotary engine and cooling system thereof in accordance with another embodiment.

Referring now to FIG. 4, a rotary engine in accordance with another embodiment is shown at 200 and includes a cooling system shown at 160. For the sake of conciseness, only features differing from the cooling system 60 described above with reference to FIG. 3 are described below.

The cooling system 160 may allow to control a mass flow of coolant through the housings 11, 18 independently from one another. Therefore, the valve 62 may include a first valve 62A fluidly connecting the source of coolant S to the side housing coolant passage 11C one of the side housings 11, a second valve 62B fluidly connecting the source of coolant S to the side housing coolant passage 11C of the other of the side housings 11, and a third valve 62C fluidly connecting the source of coolant S to the rotor housing coolant passage 18C of the rotor housing 18. The first, second, and third valves 62A, 62B, 62C may be operatively controlled by a controller. Alternatively, they may be located downstream of the housings 11, 18 and be thermostatic valve as described herein above with reference to FIG. 3. The cooling system 160 may include first, second, and third bypass valves 65A, 65B, 65C each operatively connected to a respective one of the rotor housing coolant passage 18C and the side housing coolant passages 11C. As described above, the first, second, and third bypass valves 65A, 65B, 65C may be operable to selectively flow the coolant through the heat exchanger 63 or to bypass the heat exchanger 63 via respective bypass conduits 66A, 66B, 66C. The bypass valves may be omitted in some embodiments.

In some configurations, heat to be extracted from one of the side housings 11 may be the same as the heat to be extracted from the other of the side housings 11 due to a symmetry of the rotary engine 100. In such a case, the first and second valves 62A, 62B may be replaced by a single valve that fluidly connects the source of coolant S to both of the side housings 11. Similarly, two of the bypass valves may be replaced by a single one to selectively flow the coolant exiting the two side housings 11 through the heat exchanger 63 or to bypass the heat exchanger 63 via the bypass conduits.

Figure 5:
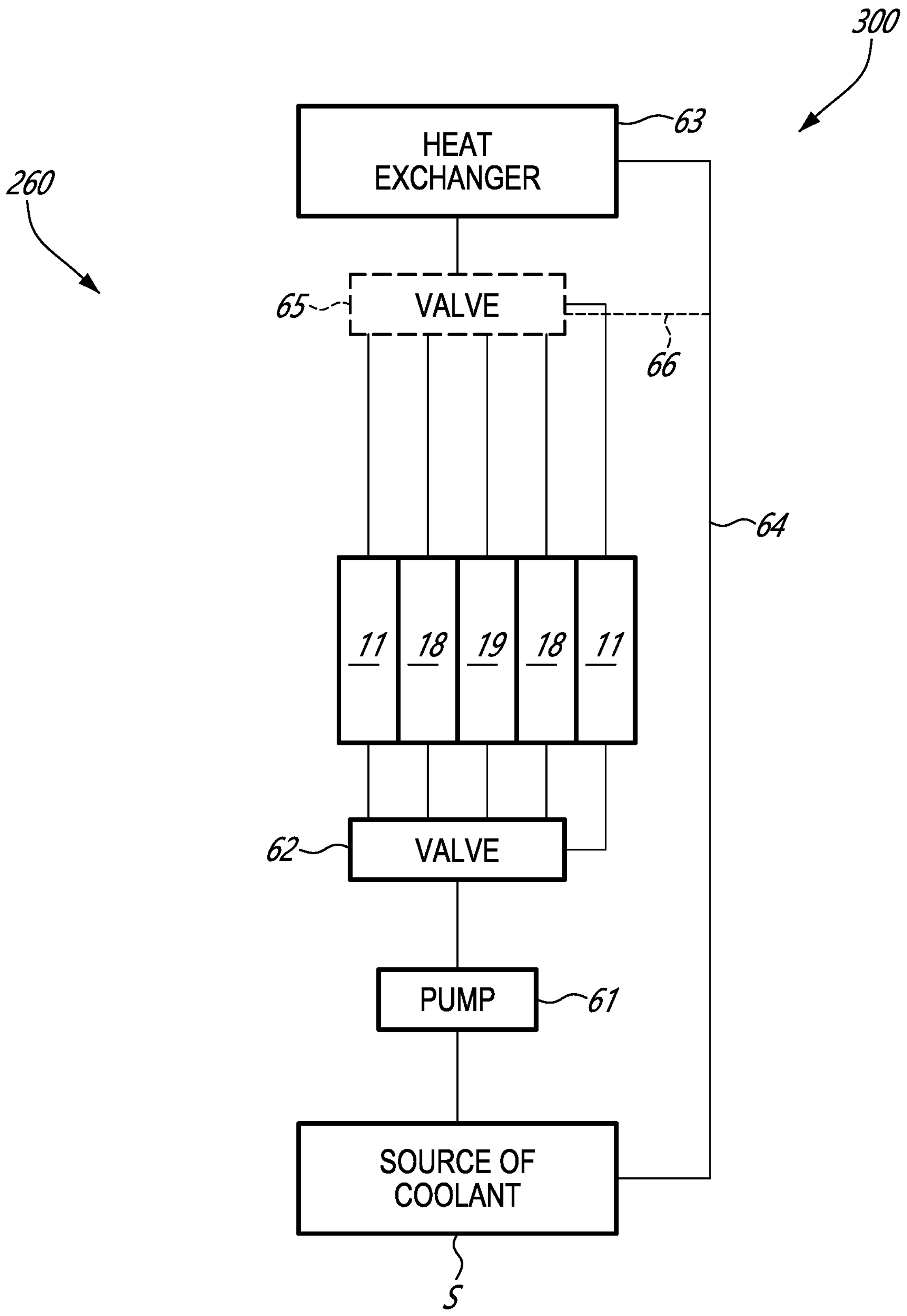
FIG. 5 is a schematic view of a rotary engine and cooling system thereof in accordance with another embodiment.

Referring to FIG. 5, a rotary engine in accordance with another embodiment is shown at 300 and includes a cooling system at 260. The rotary engine 10 includes two rotors, two side housings 11, two rotor housings 18, and an intermediate housing 19 as described above with reference to FIG. 1A. The rotors may drive a common load and may be drivingly engaged to a common shaft. Alternatively, each of the rotors may drive its respective shaft and inputs provided by shafts of the different rotors may be combined in a gearbox (not shown) having an output driving a common load. The coolant system 260 is used for cooling the different housings 11, 18, 19 during use. For the sake of conciseness, only features differing from the rotary engine 100 and coolant system 60 of FIG. 3 are described below.

In this embodiment, the pump 61 drives the flow of coolant from the source of coolant S to the different housings through the valve 62, which may be selectively closed or opened at a plurality of positions to control a flow rate of coolant through the housings 11, 18, 19. The valve 62 be a thermostatic valve located downstream of the housings as previously described. The valve 62 may be controlled by a controller.

The coolant may thus be divided between the side housing coolant passages 11C, the rotor housing coolant passage 18C, and the intermediate housing coolant passage 19B. Each of these coolant passages are fluidly separated and independent from one another as discussed above. Hence, the coolant entering one of these housings 11, 18, 19 exit the same one of these housings 11, 18, 19. The coolant passages 11C, 18C, 19B are free of a seal at mounting interfaces between the intermediate housing 19 and the rotor housings 18 and between the rotor housings 18 and the side housings 11. The coolant passages of the rotary engine are in parallel to one another.

Figure 6:
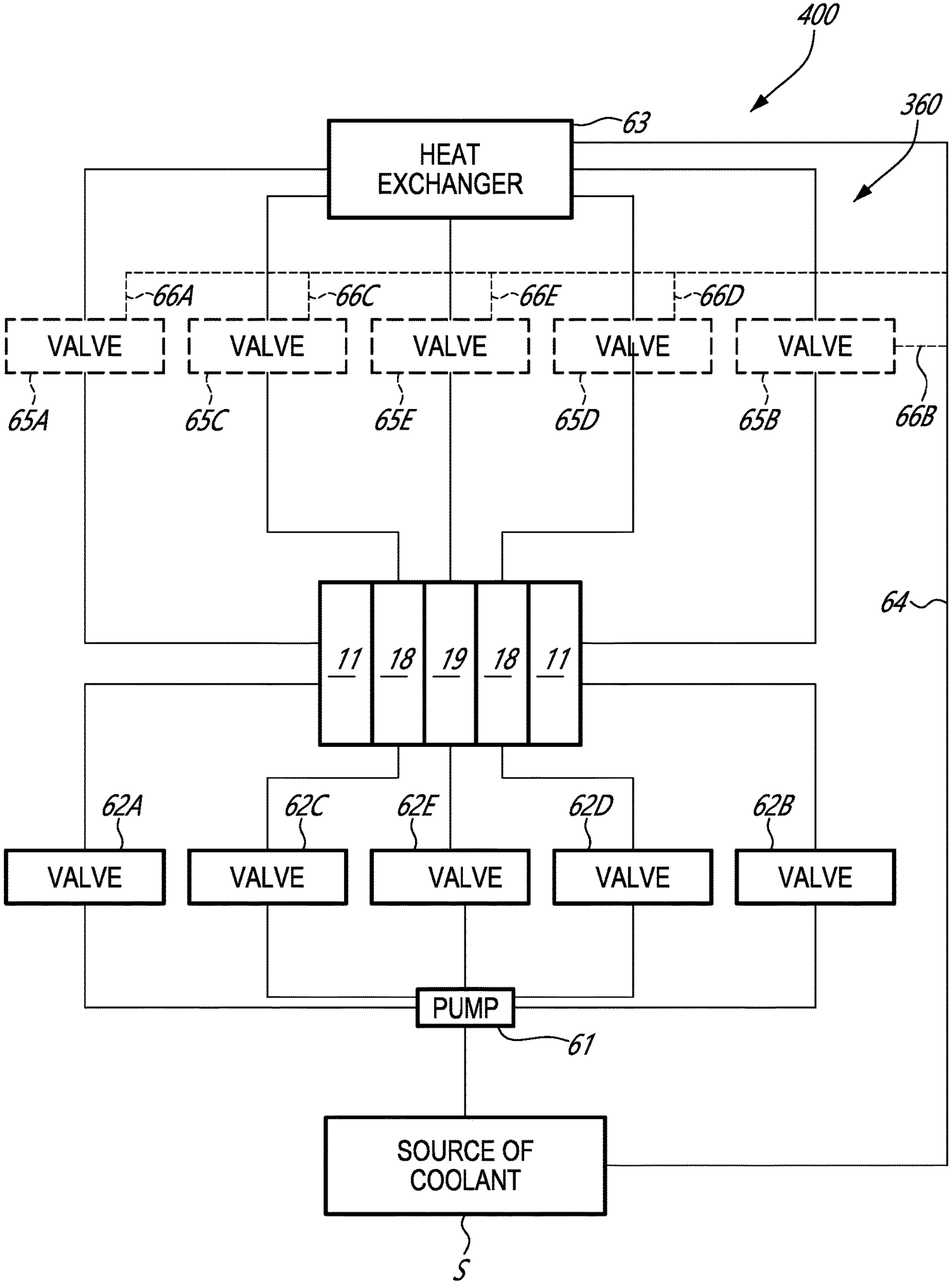
FIG. 6 is a schematic view of a rotary engine and cooling system thereof in accordance with another embodiment.

Referring now to FIG. 6, a rotary engine and coolant system in accordance with another embodiment are shown at 400 and 360, respectively. For the sake of conciseness, only features differing from the rotary engine and coolant system of FIGS. 4-5 are described below.

In this configuration, the flow rate of coolant through each of the side housings 11, rotor housings 18, and intermediate housing 19 may be individually controlled independently from one another. First and second valves 62A, 62B fluidly connect the source of coolant S to the side housing coolant passages 11C of the side housings 11; third and fourth valves 62C, 62D fluidly connect the source of coolant S to the rotor housing coolant passages 18C of the rotor housings 18; and a fifth valve 62E fluidly connects the source of coolant S to the intermediate housing coolant passage 19B of the intermediate housing 19. In some configurations, the first and second valves 62A, 62B may be replaced by a single valve since a cooling requirement of these housings may be the same due to symmetry of the engine. Similarly, third and fourth valves 62C, 62D may be replaced by a single valve since cooling requirement of these housings may be the same due to symmetry of the engine. The valves 62A, 62B, 62C, 62D, 62E may be controlled by a controller or may be thermostatic valve located downstream of the housings 11, 18, 19 as previously discussed.

First, second, third, fourth, and fifth bypass valves 65A, 65B, 65C, 65D, and 65E are used to selectively flow the coolant exiting the housings 11, 18, 19 to the heat exchanger 63 or directly back to the source of coolant S while bypassing the heat exchanger 63 and via respective first, second, third, fourth, and fifth bypass conduits 66A, 66B, 66C, 66D 66E. It will be appreciated that, for symmetry reason, the first and second bypass valves 65A, 65B may be replaced by a single valve. For this reason also, the third and fourth bypass valves 65C, 65D may be replaced by a single valve.

The different rotary engines and coolant systems disclosed herein may simplify assembly of the rotary engines since it may no longer be required to use seals at the mounting interfaces between the different housings to prevent coolant leakage. Indeed, by each having their own and respective coolant passages, interfaces between these housings may be substantially coolant leak-proof. Wear and tear issues of those seals may, at the same time, be eliminated by the removal of the coolant seals.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A rotary engine, comprising:

housings secured to one another, the housings including a first side housing, a second side housing, and a rotor housing disposed between the first side housing and the second side housing, the rotor housing including a peripheral wall having a peripheral inner face and a peripheral outer face; and a rotor rotationally received within a rotor cavity defined by the first side housing, the second side housing, and the rotor housing, the rotor contacting the peripheral inner face of the peripheral wall of the rotor housing;

wherein the first side housing, the rotor housing, and the second side housing are cooled in parallel via respective coolant passages including:

a first side housing coolant passage extending through the first side housing;

a second side housing coolant passage extending through the second side housing; and a rotor housing coolant passage extending through the rotor housing, the rotor housing coolant passage located between the peripheral inner face and the peripheral outer face, and wherein the coolant passages are free of inter-passage connection between the housings.

2. The rotary engine of claim 1, comprising flow paths extending through the housings, the flow paths including a first flow path extending within the first side housing coolant passage, a second flow path extending within the second side housing coolant passage, and a third flow path extending within the rotor housing coolant passage, the flow paths free from intersection with one another.

3. The rotary engine of claim 2, wherein the housings are secured to one another via mounting interfaces defined therebetween, the flow paths are free from intersection with the mounting interfaces between the housings.

4. The rotary engine of claim 1, wherein the coolant passages are fluidly connected in parallel to a source of coolant via a valve, having a closed configuration and one or more open configurations each having a respective flow circulating area for varying a flow rate of a coolant through the coolant passages.

5. The rotary engine of claim 4, wherein the valve includes a first valve in fluid communication with the first and second side housing coolant passages and a second valve in fluid communication with the rotor housing coolant passage.

6. The rotary engine of claim 4, wherein the valve is located downstream of the housings, the valve being a thermostatic valve operable to move from the closed configuration to one of the one or more open configurations when a temperature of the coolant flowing through the housings exceeds a temperature threshold.

7. The rotary engine of claim 1, comprising a heat exchanger fluidly connected to respective outlets of the coolant passages, the heat exchanger providing heat exchange relationship between a coolant and a heat-transfer medium.

8. The rotary engine of claim 7, comprising a bypass valve between the housings and the heat exchanger, the bypass valve operable to selectively fluidly connect the coolant passages to the heat exchanger or to a bypass conduit bypassing the heat exchanger.

9. The rotary engine of claim 1, wherein the rotor housing coolant passage includes a first section and a second section spaced apart from the first section, the rotor housing including a coolant port, a coolant inlet, and a coolant outlet, the first section fluidly connecting the coolant inlet to the coolant port, the second section fluidly connecting the coolant outlet to the coolant port.

10. The rotary engine of claim 1, wherein the housings further include an intermediate housing disposed between the first side housing and the second side housing and wherein the rotor housing includes a first rotor housing and a second rotor housing, the first rotor housing disposed between the first side housing and the intermediate housing, the second rotor housing disposed between the second side housing and the intermediate housing, the intermediate housing including an intermediate housing coolant passage fluidly separated from the first side housing coolant passage, the second side housing coolant passage, and the rotor housing coolant passage, and wherein the intermediate housing coolant passage, the first side housing coolant passage, the second side housing coolant passage, and the rotor housing coolant passage being fluidly connected in parallel with no coolant flow connection across the housings.

11. A rotary engine, comprising:

housings secured to one another, the housings including a first side housing, a second side housing, and a rotor housing clamped in sandwich between the first side housing and the second side housing, the rotor housing including a peripheral wall having a peripheral inner face and a peripheral outer face;

a rotor rotationally received within a rotor cavity defined by the housings; and a parallel flow coolant circuit operable to individually cool the first side housing, the second side housing, and the rotor housing, the parallel flow coolant circuit having first, second, and third coolant passages extending respectively through the first side housing, the second side housing, and the rotor housing, the third coolant passage located between the peripheral inner face and the peripheral outer face, wherein the first, second, and third coolant passages are fluidly independent from one another.

12. The rotary engine of claim 11, comprising flow paths extending through the housings, the flow paths including a first flow path extending within the first coolant passage, a second flow path extending within the coolant passage, and a third flow path extending within the third coolant passage, the flow paths free from intersection with one another.

13. The rotary engine of claim 12, wherein the flow paths are free from intersection with mounting interfaces between the housings.

14. The rotary engine of claim 11, wherein the first, second, and third coolant passages are fluidly connected in parallel to a source of coolant via a valve, having a closed configuration and one or more open configurations each having a respective flow circulating area for varying a flow rate of a coolant through the first, second, and third coolant passages.

15. The rotary engine of claim 14, wherein the valve includes a first valve in fluid communication with the first and second coolant passages and a second valve in fluid communication with the third coolant passage.

16. The rotary engine of claim 14, wherein the valve is located downstream of the housings, the valve being a thermostatic valve operable to move from the closed configuration to one of the one or more open configurations when a temperature of the coolant flowing through the housings exceeds a temperature threshold.

17. The rotary engine of claim 11, comprising a heat exchanger fluidly connected to respective outlets of the first, second, and third coolant passages, the heat exchanger providing heat exchange relationship between a coolant and a heat-transfer medium.

18. The rotary engine of claim 17, comprising a bypass valve between the housings and the heat exchanger, the bypass valve operable to selectively fluidly connect the first, second, and third coolant passages to the heat exchanger or to a bypass conduit bypassing the heat exchanger.

19. The rotary engine of claim 11, wherein the third coolant passage includes a first section and a second section spaced apart from the first section, the rotor housing including a coolant port, a coolant inlet, and a coolant outlet, the first section fluidly connecting the coolant inlet to the coolant port, the second section fluidly connecting the coolant outlet to the coolant port.

20. A rotary engine, comprising:

a stack of housings secured to one another and abutting one another at mounting interfaces, the housings including:

a first side housing, a second side housing, an intermediate housing, a first rotor housing disposed between the first side housing and the intermediate housing, and a second rotor housing disposed between the intermediate housing and the second side housing, the first rotor housing including a peripheral wall having a peripheral inner face and a peripheral outer face; and rotors rotationally received within rotor cavities defined by the housings, the housings being cooled in parallel via respective coolant passages extending from respective inlets to respective outlets, the respective coolant passages free from intersection with the mounting interfaces, the mounting interfaces being free of a coolant seal, a coolant passage of the respective coolant passages extends between the peripheral inner face and the peripheral outer face of the first rotor housing.

* * * * *